INFRARED HEATER

DEEP-DRAWING WITH VACUUM

INVENTOR
LUDWIG HARTMANN 3,523,149
PROCESS FOR MAKING A DEEP-DRAWN COMPOSITE OF PLASTIC FILM AND NON-WOVEN FABRIC
Ludwig Hartmann, Oberflockenbach, Germany, assignor to Carl Freudenberg, Weinheim, Germany, a corporation of Germany
Filed Dec. 15, 1965, Ser. No. 514,026
Claims priority, application Germany, Dec. 23, 1964, F 44,788
Int. Cl. B29c 17/04
U.S. Cl. 264—90
5 Claims

ABSTRACT OF THE DISCLOSURE

A deep-drawn composite of plastic film and non-woven fabric is prepared by coating a non-woven fleece of randomly disposed, partially drawn and further drawable continuous monofilaments with a deep drawable plastic followed by deep drawing the coated plastic to thereby deep-draw the plastic and further draw the drawable filaments.

---

Figure 1:
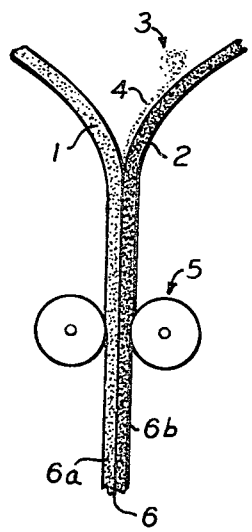

The plastic forming of artificial leather and coatings is done most conveniently by the deep-drawing of thermoplastic sheets. The disadvantage of the products manufactured in this manner lies, for one thing, in their poor thermal shape stability, since the sheet which has once been formed by the action of heat can be deformed again in precisely the same manner by another exposure to heat. Furthermore, these unreinforced sheets have an unsatisfactory tearing strength and resistance to continued tearing, as well as other disadvantageous mechanical properties. An improvement has been contributed in this regard by sheet materials supported, for example, by knit goods which could stretch to a certain extent on account of their mesh structure. It is a principal object of the instant invention to provide further improvements in this area.

According to the invention, a deep-drawn composite comprising a plastic film and a film support therefor is produced by coating a non-woven fleece comprising drawable filaments with a deep-drawable plastic, and deep-drawing the coated plastic to thereby deep-draw the plastic and draw the drawable fibers and form said composite.

In a preferred embodiment of the invention, the drawable filaments are continuous monofilaments, desirably produced by gas stream having, for example by air stream drawing of melt streams issuing from openings in a spinneret, so that the streams are drawn into the filaments while being maintained in spaced relation, and after the drawing are collected to form a non-woven fleece. Such a fleece is composed of "continuous" monofilaments, by which is meant that the monofilaments are of great length. While some breaks in the filaments may occur in the fleeces, the fleece has the character of a fleece in which the monofilaments are all continuous, terminating merely at the ends of the fleece.

The filaments formed by gas stream, or air stream drawing are partially drawn during the forming thereof, and remain further drawable, so that additional drawing occurs during the deep-drawing of the fleece coated with drawable plastic.

Though not a preferred embodiment, instead of drawable filaments, a fleece composed of undrawn staple fibers bonded together with an elastic bonding agent rendering the fleece so that it can be irreversibly elongated during drawing, can be used. In the case of extensive deep-drawing, however, difficulties have occurred because, as a result of the short fiber lengths, the fibers become loose and overstretching or tears occurs. Furthermore, the undrawn filaments tend to become brittle when stored.

By the process of the invention, especially where drawable fibers are used, the prior art difficulties are overcome and it is possible to produce artificial leather amenable to deep-drawing and having good thermal shape stability and high strength characteristics.

A batt of continuous filaments can be prepared by the spinning of fiber-forming high polymers, the filaments being slightly but not fully drawn with air. This produces a partial orientation of the filamentary molecules, the result being that, due to the adequate magnitude of the intermolecular forces, the filaments are stable during storage, but are still ductile since they have not been fully drawn. Filaments are preferably used which have elongation-to-breakage between 100% and 400%. To achieve fiber batts of great uniformity, spinnerets are used in which the holes are arranged in straight rows, the filaments being carried away from the spinneret in ranks without being combined into strings or cables. This can be done, for example, by the use of the spinneret with guiding passage described in application Ser. No. 430,092, filed Feb. 3, 1965, and now Pat. No. 3,379,811.

However, other appropriate apparatus can be used for the purpose, as long as the principle is preserved that the filaments are carried away from the spinnerets in straight ranks, preferably with the aid of streaming gases, and remain separate from one another for a distance of, for example, 600 mm., up to the moment of formation of the batt. In this manner the best possible distribution of the filaments is assured—a fact which is of great importance to the ability of the product to be uniformly shaped afterwards. In the manufacture of classical batts from short fibers, clumping of fibers cannot be avoided, and results in areas of various density, which manifests itself in the plastic shaping or deep-drawing in the form of thin spots and tears.

The spinning of ranks of adjacent filaments and drawing them by means of air streams applied from both sides also has the advantage of identical treatment of the linearly co-adjacent filaments. In this manner, both the drawing conditions and the cooling conditions can be made substantially identical for all filaments. The latter is of importance inasmuch as the cooling also assures the freezing of the molecular orientation that has been achieved by the drawing forces on the molten filament. The manufacture of the above-mentioned fiber fleeces can be performed, for example, by means of the process and apparatus described in application Ser. No. 341,489, filed Jan. 27, 1964. After the batt or fleece has been formed, the filaments in the fleece can be adhered together at isolated points. This can be performed, for example, by autogenous solidification by making the fiber surface sticky or with the aid of secondary bonding agents, such as by treatment with rubber or plastic dispersions or solutions.

Thereafter the fleece thus formed can be subjected to a laminating or coating process in order to produce the plastic or artificial leather surface. For example, a PVC sheet is made by calendering by prior art methods. This sheet is coated with a sticky PVC paste and the fleece manufactured by the above process is laminated to it by means of a press. Simultaneously with the laminating process, which is performed preferably along with the application of heat, the surface of the PVC sheet can be embossed. The PVC coating can also be applied by brushing or rolling it on. In addition to PVC or plasticized PVC mixtures, other film-forming high polymers can of course be used, such as polyurethanes, for example, for the manufacture of the artificial leather surface. It is important in any case that the deep-drawability of the sheet material and the fiber fleece be matched to one another so that both the fleece filaments and the plastic coating are drawn (irreversibly elongated) during the deep-drawing operation.

The same is true especially in regard to the temperature range in which deep-drawability occurs, i.e. the temperature should be such that the required drawing will occur. This can be varied in the case of the fleece by the degree of draft given to the filaments and by the nature of the polymer which is used for the manufacture of the filaments. Polyamides, polypropylene, polyurethanes and polyesters have thus far proven good in this application. Thermoplastic fibers in general can be used. Another factor is the nature of the bond which is used in adhering the filaments to one another. A preferred embodiment consists in bonding the filaments by means of a binding agent which can simultaneously serve as a binding agent between the filaments and the sheet material. Accordingly, a binder adhesive with respect to the plastic sheet is desirable.

The following example illustrates one embodiment of this kind, though it is not to be interpreted as a restriction as regards the chemical combinations.

EXAMPLE

Polycaprolactam (extract content 0.4 ηred 2.27) was spun out of a spinning device which consisted of 12 adjacent spinnerets of the kind described in the example (page 9) of the application Ser. No. 430,092, filed Feb. 3, 1965. 1.5 normal cubic meters per minute of air at 235° C. were pumped in per spinneret (spinneret temperature, 240° C.) and ejected from two slits 0.3 mm. wide and at a distance of 0.4 mm. on both sides of the row of spinneret holes, in the fiber spinning direction. The row of filaments emerging from each spinneret was fed together with the air streams enveloping it on both sides into a guiding channel 40 mm. away, in the manner represented in FIG. 3 of said application Ser. No. 430,092. This resulted at the lower end of the 600 mm. long passage in an air velocity in the passage itself of 1,000 meters per minute at a temperature of 60° C. At a pumping speed of 0.1 cc. per spinneret hole of 400 microns diameter, filaments were obtained with the following properties:

1 denier
3.5 grams per denier
170% elongation to breakage

By aspiration onto a continuously moving wire screen running at a speed of 2.5 m./min., a fiber batt was obtained weighing 60 grams per square meter of area. This batt was imbided by means of an impregnating mechanism with a 20% dispersion of a butadiene acrylonitrile polymer containing 4% copolymerized acrylic acid. After drying, a binding agent absorption of 60 g./m.² was obtained.

This batting was laminated at a temperature of 140° to a PVC calender sheet plasticized by means of 30% of a copolymeric butadiene acrylonitrile styrene plasticizer and 20% dioctylphthalate, making use of a PVC plastisol. The weight of the sheet amounted to 600 grams per square meter, and that of the PVC plastisol adhesive was 50 g./m.².

The laminate thus manufactured was outstandingly well suited for deep-drawing by vacuum forming, the PVC side of the laminate being advantageously warmed to about 140° and the fiber batt side to about 160° prior to forming.

Figure 2:
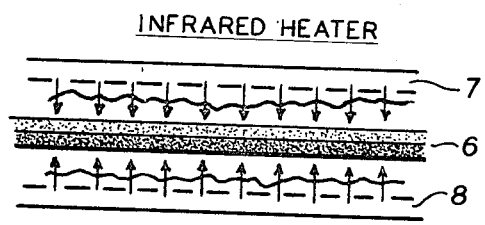
Figure 3:
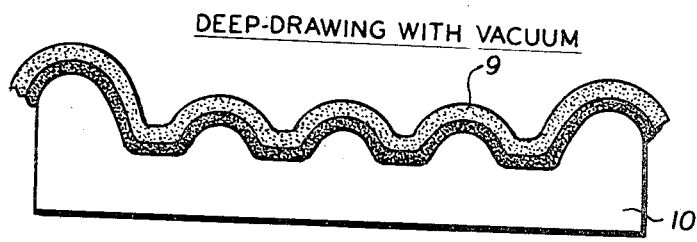
Figure 4:
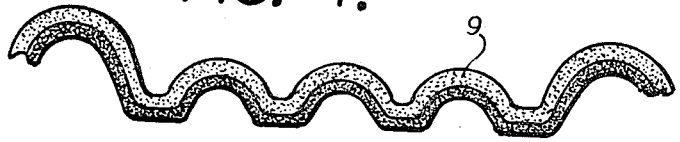

The invention is further described in reference to the accompanying drawing, wherein:

FIG. 1 depicts the forming of a deep-drawable artificial leather composite 6: a plastic sheet 1 and a non-woven fleece 2 having a plastisol or adhesive film 4 applied at 3, are calendered together by the rolls 5, to provide the composite 6 composed of plastic coating 6a and non-woven fiber fleece support 6b;

FIG. 2 shows schematically the heating of the fleece to condition it for deep drawing: the composite 6 is passed through an infrared radiator comprising an upper heating bank 7 and a lower heating bank 8;

FIG 3 shows the composite on a deep-drawing, vacuum device: the composite is formed into shaped structure 9 by vacuum drawing on the vacuum drawing device 10; and FIG. 4 shows the shaped structure 9 removed from the deep-drawing device.

While the invention has been described with respect to particular embodiments thereof, these embodiments are merely representative and do not serve to define the limits of the invention.

What is claimed is:

1. Process for the manufacture of a deep-drawn composite comprising a plastic film and a fibrous support therefor which comprises:
    (a) coating a non-woven fleece consisting essentially of randomly disposed, partially drawn and further drawable continuous monofilaments formed by gas stream drawing and collected to form the non-woven fleece, said continuous monofilaments having an elongation to breakage of about 100–400% and being bonded together with a binding agent, with a deep-drawable plastic,
    (b) deep-drawing the coated plastic to thereby deep-draw the plastic and draw the drawable filaments and form said composite.

2. Process according to claim 1, wherein said plastic is a polyurethane or polyvinylchloride plastic, and said filaments are polycaprolactam polymers.

3. Process according to claim 1, wherein said binder is adhesive with respect to the plastic coating and bonds the coating to the fleece.

4. Process according to claim 1, and the step of bonding the fleece to the plastic coating.

5. Process according to claim 1, wherein the deep drawing is by vacuum drawing.

References Cited

UNITED STATES PATENTS

| 2,915,427 | 12/1959 | Schriner et al. | |
| 3,072,520 | 1/1963 | Groth | 156—213 |
| 3,304,220 | 2/1967 | McIntyre | 156—180 X |
| 3,407,104 | 10/1968 | Crandall | 156—285 X |

ROBERT F. BURNETT, Primary Examiner

R. L. MAY, Assistant Examiner

U.S. Cl. X.R.

117—140; 156—245, 285; 161—170; 264—134